United States Patent [19]

Rosen

[11] 4,280,376
[45] Jul. 28, 1981

[54] PLANETARY GEAR SYSTEM AND GEARS THEREFORE

[75] Inventor: George Rosen, West Hartford, Conn.
[73] Assignee: Energistics, Inc., Bloomfield, Conn.
[21] Appl. No.: 39,770
[22] Filed: May 17, 1979
[51] Int. Cl.³ .......................... F16H 3/44; F16H 55/08
[52] U.S. Cl. ........................................ 74/788; 74/462; 74/801
[58] Field of Search ............... 74/788, 801, 797, 457, 74/460, 462

[56] References Cited

U.S. PATENT DOCUMENTS

| 1,434,987 | 11/1922 | Bostock et al. | 74/462 |
| 2,422,326 | 6/1947 | Wildhaber | 74/462 |
| 3,164,915 | 1/1965 | Benner et al. | 74/801 X |
| 3,631,736 | 1/1972 | Saari | 74/462 |
| 3,792,629 | 2/1974 | Applebury | 74/801 |
| 3,918,315 | 11/1975 | Rouverol | 74/462 |
| 3,982,445 | 9/1976 | Rouverol | 74/462 |
| 4,040,312 | 8/1977 | Tappen et al. | 74/801 |

*Primary Examiner*—Allan D. Herrmann
*Attorney, Agent, or Firm*—McCormick, Paulding & Huber

[57] ABSTRACT

A single-stage high-ratio compound planetary gear system has gears configured for optimal tooth profile contact to minimize Hertzian stresses under relatively high contact loads characteristic of high-ratio gearing. Criteria is established for determining the optimal line of action required to attain a substantially constant relative radius of curvature between the teeth of a mating set and optimal tooth geometry for maximal contact between mating teeth.

13 Claims, 6 Drawing Figures

U.S. Patent  Jul. 28, 1981  Sheet 1 of 3  4,280,376

PLANETARY GEAR SYSTEM AND GEARS THEREFORE

BACKGROUND OF THE INVENTION

This invention relates in general to planetary transmission systems and gearing and deals more particularly with an improved single-stage compound planetary gear system embodying such gearing.

Heretofore it has been general practice in the planetary transmission art to utilize multi-staging of a series of planetary gear sets where high ratios of speed change (greater than about 10:1) have been required. In special cases where size, weight and efficiency have not been critical, compound planetary gearing has been used in high gear ratio transmissions. Either approach has generally utilized involute gears or modified involute gear forms. In such transmission systems it has been the usual practice to utilize wide gears, that is gears wherein the ratio of the face width to pitch diameter (F/D) is greater than 1 to compensate for high Hertzian stresses encountered in high-ratio meshes. This approach has been generally preferred to the use of relatively large diameter gears to maintain proper design stress limits on gear teeth and bearings. However, such wide gears are usually relatively heavy and tend to produce more severe load gradients across the tooth faces due to axial misalignments between meshing gears. Self-aligning mechanisms have been utilized such as floating, spline members, cams, and flexing type mechanisms to overcome this problem, however, the provision of such special support structures add substantially to the cost and complexity of a transmission system.

The present invention is concerned with the aforesaid problems. Specifically, it is the general aim of the invention to provide an improved single-stage compound planetary gear system which utilizes improved gearing whereby a broad range of high-gear ratios can be attained in a relatively simple transmission system utilizing gears having low face width to pitch diameter ratios (F/D less than 1.0).

SUMMARY OF THE INVENTION

In accordance with the invention, a planetary gear system is provided which has a first ring gear, a pair of planet gears, and means supporting the planet gears for coaxial rotation in unison and about the axis of the first ring gear with one of the planet gears in mesh with the first ring gear. A sun gear journaled for coaxial rotation relative to the first ring gear meshes with the other of the planet gears. The system further includes a second ring gear journaled for coaxial rotation relative to the first ring gear and in mesh with the other planet gear. At least one of the sets of meshing gears in the system has gears engaged along a line of action in accordance with the equation:

$$Y = -(\chi_p \tan\phi_o + \chi_p^3 b)$$

Wherein:
$\phi_o$ is the pressure angle;
Y is one rectangular coordinate of a point on the line of action;
$\chi_p$ is the other rectangular coordinate of said point; and b has a value other than zero.

DETAILED DESCRIPTION OF PREFERRED EMBODIMENT

Figure 1:
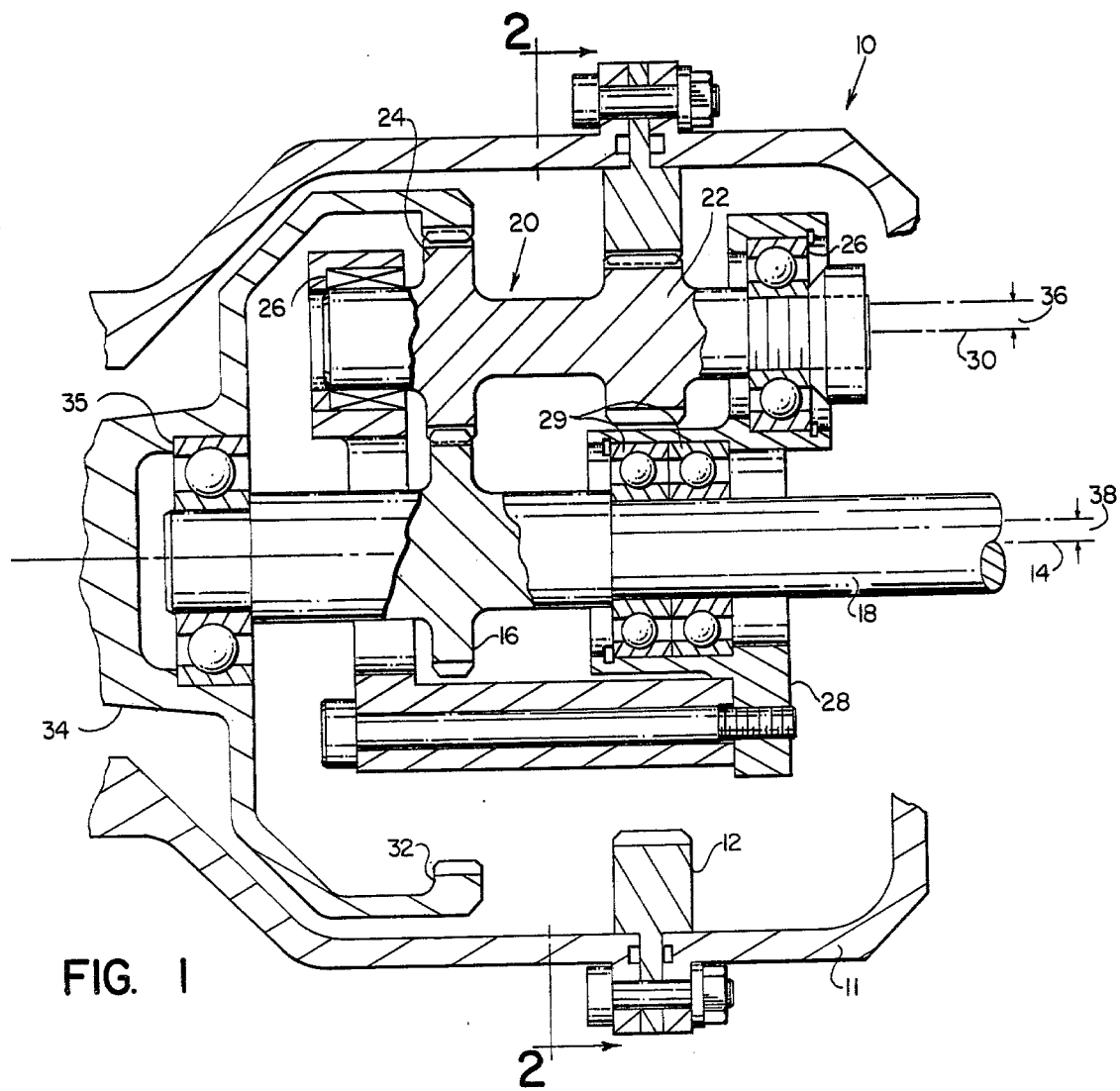
FIG. 1 is an axial sectional view through a high-ratio compound planetary transmission embodying the invention.
Figure 2:
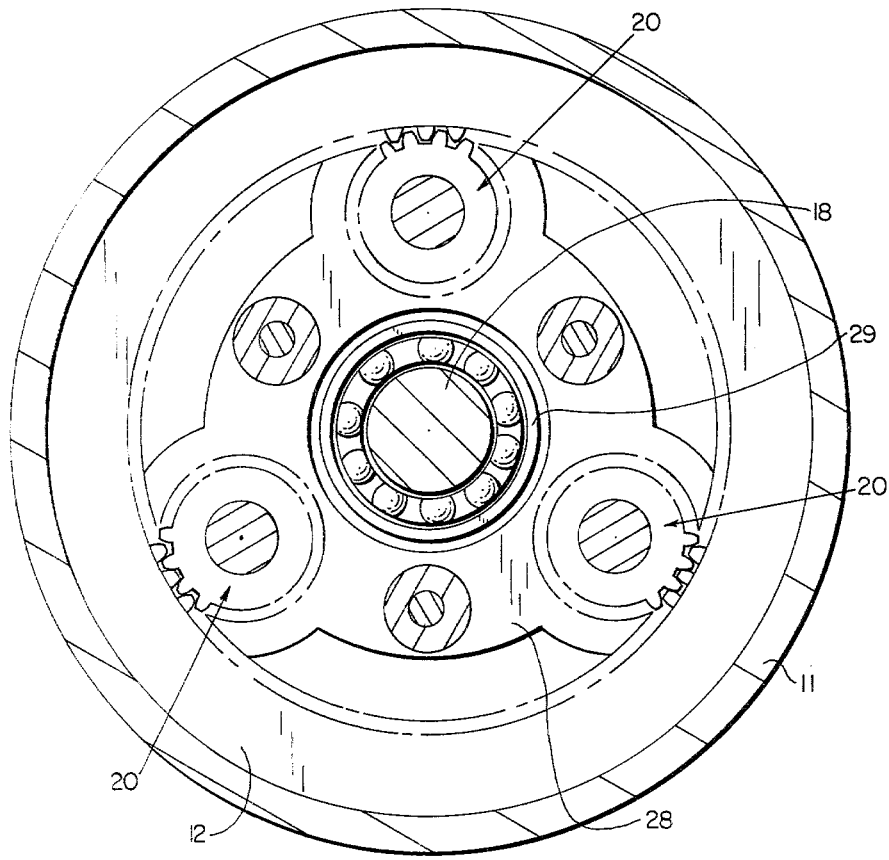
FIG. 2 is a sectional view taken along the line 2—2 of FIG. 1.

Turning now to the drawings and referring first particularly to FIG. 1, a high-ratio compound planetary gear box or transmission embodying the invention is indicated generally by the reference numeral 10. The transmission 10 includes a housing 11 and a fixed ring gear 12 which has an axis 14 and functions as a reaction member. A sun gear 16, mounted on an input shaft 18, is journaled for rotation about the axis 14. In accordance with the invention, at least one planet pinion, indicated generally at 20, and which includes a pair of planet gears 22 and 24, is supported by bearings 26, 26 in a carrier or cage 28 for coaxial rotation in unison about an axis 30. The illustrated transmission 10 includes three such planet pinions supported in axially parallel and equiangularly spaced relation by the carrier 28, as best shown in FIG. 2. The carrier 28 is journaled in bearings 29, 29 mounted on the input shaft 18 and rotates about the axis 14 with the planet gear 22 in intermeshing engagement with the ring gear 12 and the planet gear 24 in intermeshing engagement with the sun gear 16. Another ring gear 32 carried by an associated output shaft 34 is intermeshingly engaged with the planet gear 24 and journaled for rotation about the central axis 14 by another bearing 35 mounted on one end of the input shaft 18. While the shafts 18 and 34 are designated, respectively, as input and output shafts it will be apparent that the shaft 34 could function as the input shaft and the shaft 18 as the output shaft without modifying the structure.

In accordance with the present invention, at least one pair of mating gears, and preferably all of the mating gears in the aforedescribed gear train, are configured to provide optimal tooth profile contact, as will be hereinafter further discussed, to minimize Hertzian stresses, so that gears of relatively narrow width may be utilized in the system 10. This arrangement permits a wide range of gear ratios while maintaining conservative stress levels. In the illustrated embodiment 10 the face width-pitch diameter ratio (F/D) of the various gears is less than 1.0. Furthermore, a wide range of input/output ratios may be attained for a single gear box envelope with minimal modification, all of which will be hereinafter further discussed. Further, and in accordance with the invention the radial clearance in the bearings 26, 26, substantially enlarged and designated by the numeral 36, is greater than the eccentric tolerance 38 of the system, that is the eccentric tolerance between the axes of the sun gear 16 and the movable ring gear 32, which tolerance is controlled, at least in part, by clearance in the bearings 29, 29 and 35.

Figure 3:
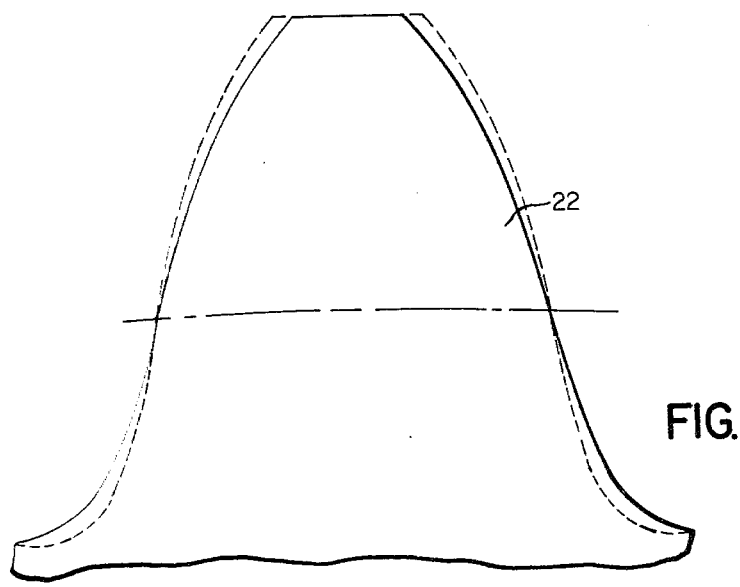
FIG. 3 is a fragmentary transverse sectional view of a gear and shows a typical tooth embodying the invention, the general profile of a comparable involute tooth being shown in broken lines.

Considering now the gear geometry and more specifically the criteria for determining the optimum gear tooth profiles of a pair of meshing gears in the system 10, and referring now to FIG. 3, the general tooth contact profile of a typical gear used in the transmission system 10, such as the pinion gear 22, is shown in full lines. The contour profile of a conventional tooth of an involute gear of comparable size is shown in broken lines, for the purpose of comparison. It should be noted that the tooth of the pinion 22 has a substantially greater curvature than that of the illustrated involute tooth.

The line of action or path of contact for a pair of conventional mating involute gears is a straight line which passes through the pitch point and is tangent to the base circles of the gears and is defined by the equation:

$$Y = -(\tan \phi \chi_p)$$

wherein:
$\phi$ is the pressure angle
y is one rectangular coordinate of a point on the line of action and $\chi_p$ is the other coordinate of said point.

Figure 4:
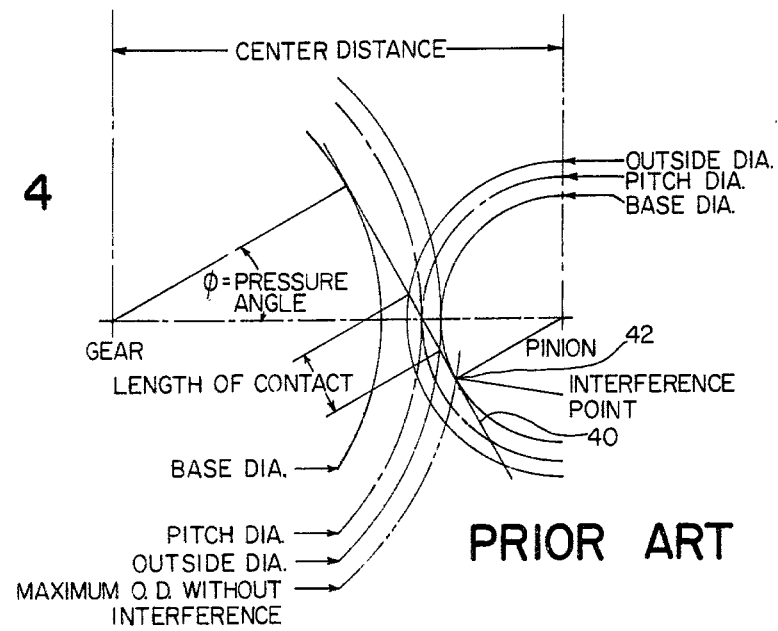
FIG. 4 is a diagramatic illustration of a pair of involute gears of the prior art.

The condition set forth in the aforesaid equation for the line of action of a conventional involute gear and meshing pinion is illustrated in FIG. 4 where the line of action is designated by the numeral 40. The interference point, designated 42, determines the maximum gear outside diameter which may be used without interference. The usable length of contact along the line of action is also indicated in FIG. 4.

The criteria for determining optimum tooth geometry in accordance with the invention requires departure from the conventional straight line form of the line of action for conventional involute gears. In accordance with the invention the optimum geometry of gear tooth profiles of a typical pair of mating gears, designated gears 1 and 2, and diagramatically illustrated in FIG. 5, is controlled by the equation:

$$Y = -(\chi_p \tan \chi_o + \chi_p^3 b)$$

wherein:
$\phi_o$ is the pressure angle;
y is one rectangular coordinate of a point on the line of action;
$\chi_p$ is the other rectangular coordinate of said point; and b has a value other than zero.

Figure 5:
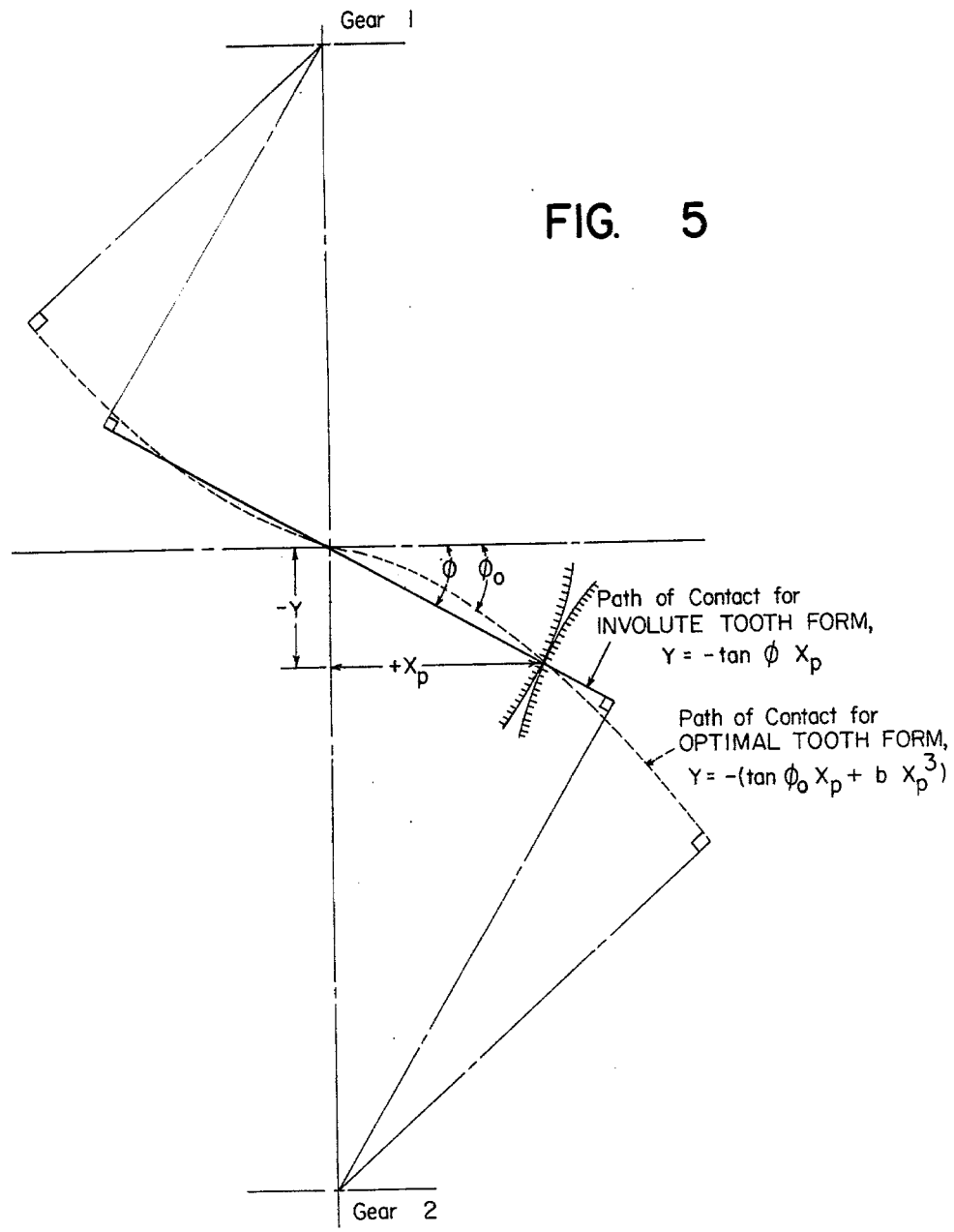
FIG. 5 is a diagramatic illustration of a pair of gears embodying the invention.

The line of action defined by the aforesaid equation has a curved path, as shown in FIG. 5. The curvature of the path being controlled by the value of b. The specific criteria for determining the optimal tooth contact profiles for each mesh is the unique shape of the path of contact which yields a constant relative radius of curvature through a range of vaues of y. The relative radius of curvature for two meshing gears is defined by the equation:

$$R_{RC} = \frac{R_{C1} \cdot R_{C2}}{R_{C1} + R_{C2}}$$

wherein:
$R_{C1}$ = radius of curvature of gear 1 and
$R_{C2}$ = radius of curvature of gear 2.

Figure 6:
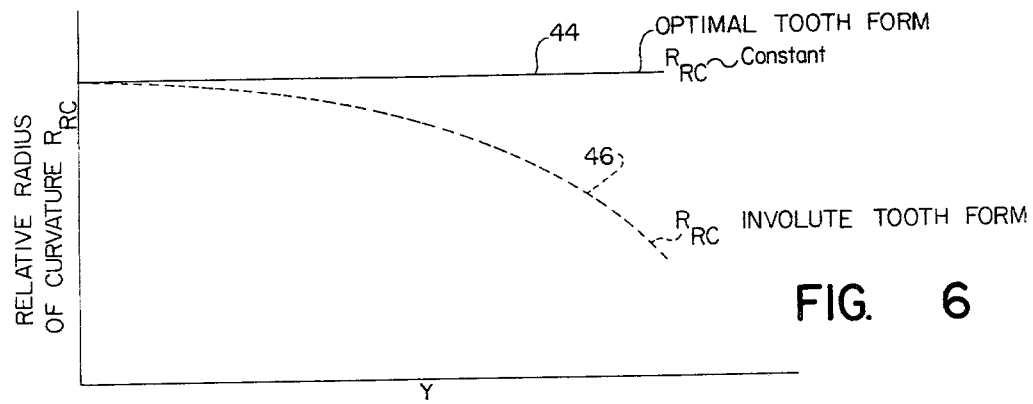
FIG. 6 is a graphic illustration of a condition of optimal tooth geometry, a comparable condition of an involute tooth form being indicated by a broken line.

Since it is the value of b in the aforesaid equation for the line of action which controls the curvature of the path of contact, or line of action, and the relative radius of curvature of the two meshing gears, it is necessary to determine the specific value of b which will yield a substantially constant relative radius of curvature $R_{RC}$ through a range of values of y which define coordinates along the usable length of the line of action. This condition is illustrated in FIG. 6 wherein relative radius of curvature $R_{RC}$ of two mating gears is plotted against y. The condition where the relative radius of curvature $R_{RC}$ is approximately constant over a range of values of y is shown by the solid line plot 44 and illustrates the condition attained where the optimal value of b for a given mesh is used in determining the gear tooth profiles of a pair of meshing gears, in accordance with the invention.

The broken line plot indicated by the numeral 46 in FIG. 6 illustrates the manner in which the relative radius of curvature $R_{RC}$ of a pair of conventional meshing involute gears varies for a range of values of y wherein the line of action of the gears is determined by the conventional equation for the line of action:

$$Y = -(\chi_p \tan \phi)$$

Determination of the specific optimal value of b involves an iterative process starting with selected values b and proceeding through the trigometric solutions which relate to the line of action. This complex process of calculation may be best accomplished by programmed computer analysis.

Further mathematical calculations are required to establish the coordinates which define the desired optimal tooth profiles of the meshing gears. Since these calculations are well known to those skilled in the gear art they are not set forth here.

The specific value of "b" which gives the desired constant relative radius of curvature of a pair of meshing gears is dependent on their respective numbers of teeth, diametral pitches and pressure angle. Due to the complex trigonometric inter-relations between these parameters and the optimum tooth forms it is not possible to solve directly for the optimum value of "b". However, the reverse process, starting with an estimated value of "b" and solving, in turn, for the gear tooth coordinates and then the relative radius of curvature along the path of contact provides a direct solution. Accordingly the process for determining the optimum value of "b" for a given pair of gears is as follows:

(1) Assume an initial estimated value of "b". (For most practical gear geometrics it has been discovered that "b" will not exceed a value of 0.5. Since the other limiting value is b=0.0, which corresponds to the conventional involute tooth form, a good starting value for "b" is around 0.2 to 0.3.

(2) Calculate and plot the relative radius of curvature versus the "y" coordinate for the assumed value of "b". If the relative radius of curvature increases with increasing "y" this value of "b" is too large and conversely if the relative radius of curvature decreases with increasing "y" the estimated value of "b" is too small.

(3) Repeat this process with appropriately adjusted values of "b" until the relative radius of curvature becomes essentially constant. This final iteration is then the optimum value of "b" which defines the desired tooth forms for the specific pair of gears.

In actual practice this entire process can be programmed for computer solution. In that case it is not necessary to manually plot the curves of $R_{RC}$ versus y for each iteration to determine when the optimum value of "b" is reached. The computer can be programmed to automatically iterate the values of "b" until the $R_{RC}$ becomes constant. With modern computer technology this procedure provides a very rapid solution.

The optimized tooth forms defined by the criteria of constant relative radius of curvature minimize the Hertz contact stress at the incoming and outgoing mesh points when compared to equivalent involute gear tooth forms.

When the planetary gear system 10 is provided with at least one set of meshing gears, such as the ring gear 12 and the pinion gear 22, having tooth profiles as aforedescribed, a wide range of ratios (approximately 10:1 to more than 2,000:1) is possible in a prescribed gear box envelope for a given torque rating by merely changing the relative number of teeth on the ring gear 12 and its mating pinion gear 22. All other principal components of the planetary gear system 10, such as the planet carrier, sun gear and rotating ring gear as well as the housing, seals and bearings may remain unchanged. As previously noted, gears profiled in the aforeprescribed manner may be relatively narrow (F/D less than 1.0) which enables a relatively light transmission package. Further, the use of such relatively narrow gears tends to minimize the problems associated with slight axial misalignments within the system. Optimalization of the gear tooth form, as hereinbefore described, enables equalized load sharing on all planet pinions and minimizes loading of the cage bearings 29, 29 without resorting to complex mechanisms of the prior art, such as floating spline members, cams, and flexing type mechanisms. Since the bearing clearances 36, 36 exceed the eccentric tolerance 38 between the axes of the movable ring gear 32 and the sun gear 16 the carrier assembly 10 is free to seek a running center. When load equilibrium is attained the planet cage assembly essentially floats within its bearing. Close control of planet pinion bearing locations and gear tooth shapes must be maintained for practical implementation of this concept.

I claim:

1. In a planetary gear system having a first ring gear, a pair of planet gears, means supporting said planet gears for coaxial rotation in unison and for rotation about the axis of said first ring gear with one of said planet gears in intermeshing engagement with said first ring gear, a sun gear journaled for coaxial rotation relative to said first ring gear and in intermeshing engagement with the other of said planet gears, and a second ring gear journaled for coaxial rotation relative to said first ring gear and in intermeshing engagement with said other planet gear, said first ring gear and said one planet gear forming one set of gears, said sun gear, said other planet gear and said second ring gear forming another set of gears, the improvement wherein each gear in at least one of the sets is engaged with another of the gears in said one set along a line of action in accordance with the equation:

$$Y = -(\chi_p \tan\phi_o + \chi_p^3 b)$$

wherein:
$\phi_o$ is the pressure angle;
y is one rectangular coordinate of a point on said line of action;
$\chi_p$ is the other rectangular coordinate of said point; and b has a value other than zero.

2. In a planetary gear system as set forth in claim 1 the further improvement wherein b has a positive value.

3. In a planetary gear system as set forth in claim 1 the further improvement wherein the value of b is not greater than 0.5.

4. In a planetary gear system as set forth in claim 1 the further improvement wherein the ratio of the face width to the pitch diameter of each of said gears in said one of said sets is less than 1.0.

5. In a planetary gear system as set forth in any one of claims 1 through 4 the further improvement wherein the relative radius of curvature of the teeth in said one set of gears is substantially constant throughout a range of values of y which define coordinates along the usable length of said line of action.

6. In a planetary gear system as set forth in claim 1 the further improvement wherein said means supporting said planet gears comprises a carrier and bearings supporting said planet gears in said carrier and said bearings have a radial clearance greater than the eccentric tolerance of said system.

7. In a planetary gear system as set forth in claim 6 the further improvement wherein said eccentric tolerance of said system is further characterized as the eccentric tolerance between said sun gear and said second ring gear.

8. In a planetary gear system as set forth in claim 6 the further improvement wherein said carrier and said second ring gear are supported by bearings and the bearings which support said planet gears have a radial clearance greater than the radial clearance of the bearings which support said carrier and said second ring gear.

9. A pair of mating gears including an internal ring gear and at least one planet gear having a line of action in accordance with the equation:

$$y = -(\tan\phi_o \chi_p + \chi_p^3 b)$$

wherein:
$\phi_o$ is the pressure angle;
y is one rectangular coordinate of a point on said line of action;
$\chi_p$ is the other rectangular coordinate of said point; and
b has a value other than zero.

10. A pair of mating gears as set forth in claim 9 wherein b has a positive value.

11. A pair of mating gears as set forth in claim 9 wherein the value of b is not greater than 0.5.

12. A pair of mating gears as set forth in claim 9 wherein the ratio of the face width to the pitch diameter of each of the gears in said pair is less than 1.0.

13. A pair of mating gears as set forth in any one of claims 9 through 12 wherein the relative radius of curvature of the tooth profiles of each of the gears in said pair is substantially constant throughout a range of values of y which define coordinates along the usable length of said line of action.

* * * * *